United States Patent
Wu et al.

(10) Patent No.: US 8,545,085 B2
(45) Date of Patent: Oct. 1, 2013

(54) BACKLIGHT MODULE AND LIGHT GUIDE PLATE THEREOF

(75) Inventors: Sung-Tao Wu, Tainan County (TW); Yuan-Chi Lee, Tainan County (TW)

(73) Assignee: Chi Lin Optoelectronics Co., Ltd., Tainan (TW)

( * ) Notice: Subject to any disclaimer, the term of this patent is extended or adjusted under 35 U.S.C. 154(b) by 716 days.

(21) Appl. No.: 12/688,313

(22) Filed: Jan. 15, 2010

(65) Prior Publication Data
US 2011/0176330 A1    Jul. 21, 2011

(51) Int. Cl.
*F21V 7/04*    (2006.01)

(52) U.S. Cl.
USPC .......... 362/619; 362/97.1; 362/612; 362/615; 362/606

(58) Field of Classification Search
USPC ......... 362/606, 607, 610, 615–620, 623–628, 362/97.1–97.4
See application file for complete search history.

(56) References Cited

U.S. PATENT DOCUMENTS

| | | | | |
|---|---|---|---|---|
| 5,751,386 A * | 5/1998 | Kanda et al. | ..................... | 349/65 |
| 7,085,056 B2 * | 8/2006 | Chen et al. | ..................... | 359/566 |
| 7,607,816 B2 * | 10/2009 | Li | ..................... | 362/621 |
| 7,717,600 B2 * | 5/2010 | Lim et al. | ..................... | 362/606 |
| 7,806,580 B2 * | 10/2010 | Lin | ..................... | 362/606 |
| 2002/0080598 A1 * | 6/2002 | Parker et al. | ..................... | 362/31 |
| 2007/0139965 A1 * | 6/2007 | Liao | ..................... | 362/615 |
| 2007/0230214 A1 * | 10/2007 | Koganezawa et al. | ..................... | 362/608 |
| 2011/0176089 A1 * | 7/2011 | Ishikawa et al. | ..................... | 349/65 |

FOREIGN PATENT DOCUMENTS

TW    200504424    2/2005

OTHER PUBLICATIONS

English Abstract of TW200504424.

\* cited by examiner

*Primary Examiner* — Evan Dzierzynski
*Assistant Examiner* — Danielle Allen
(74) *Attorney, Agent, or Firm* — WPAT, P.C.; Anthony King

(57) ABSTRACT

The present invention relates to a backlight module and light guide plate thereof. The light guide plate includes a first surface, a second surface and a side surface. The first surface has a plurality of first regions, a second region and a central line. The second region has a plurality of microstructures outside the first regions. The first regions and the second region are solid. The side surface is disposed between the first surface and the second surface. The first regions are adjacent to the side surface and extend toward the central line, and the first regions are intervally spaced. Whereby, the manufacture step of the light guide plate is simplified, and the manufacture cost of the light guide plate is lowered, and the distribution of the microstructures can reduce the hot spots in front a plurality of point light sources efficiently.

18 Claims, 4 Drawing Sheets

BACKLIGHT MODULE AND LIGHT GUIDE PLATE THEREOF

BACKGROUND OF THE INVENTION

1. Field of the Invention

The present invention relates to a backlight module and a light guide plate thereof, and more particularly to a light guide plate with microstructures and a backlight module including the same.

2. Description of the Related Art

FIG. 1 shows a schematic view and FIG. 2 shows a bottom view of FIG. 1, of a conventional backlight module disclosed in Taiwan (R.O.C.) patent publication no. 200504424. The backlight module 1 includes a plurality of LEDs 11 and a light guide plate 12. The LEDs 11 are used to provide a plurality of light beams. The light guide plate 12 is used to receive the light beams from the LEDs 11. The light guide plate 12 has a first surface 121, a second surface 122, a side surface 123, a plurality of grooves 124 and a plurality of dots 125. The first surface 121 is opposite the second surface 122, and the side surface 123 is adjacent to the first surface 121 and the second surface 122. The grooves 124 are formed by cutting or injection molding and are disposed on the side surface 123. The grooves 124 are empty space and have openings on the side surface 123. The grooves 124 are intervally spaced so as to reduce hot spots in front of the LEDs 11. The groove 124 is triangular and has two edges 1241 and an intersecting point 1242. The edges 1241 intersect at the intersecting point 1242.

The LEDs 11 face the side surface 123 and are disposed in the grooves 124, so that the light beams enter the light guide plate 12 through the grooves 124, and the light beams are then transmitted to a diffusion film (not shown) through the second surface 122. The dots 125 are printed on the first surface 121 of the light guide plate 12 to form a pattern, so as to reflect or refract most light beams back to the interior of the light guide plate 12.

The backlight module 1 has the following disadvantages. The light beams from the LEDs 11 must pass through the air in the grooves 124 before entering the light guide plate 12. Because of the inclination of the edges 1241, a hot spot will still occur at the intersecting point 1242. Additionally, the dots 125 are not distributed over the entire area of the first surface 121. That is, there is a large blank margin 1211 between the leftmost dot 125 and the side surface 123. The blank margin 1211 has no dot; therefore, large area of the blank margin 1211 will lower the luminance of the light guide plate 12. Additionally, part of the energy of the light beams form the LEDs 11 will lose because of the large gap between the LEDs 11 and light guide plate 12.

Therefore, it is necessary to provide a backlight module and a light guide plate thereof to solve the above problems.

SUMMARY OF THE INVENTION

The present invention is directed to a light guide plate comprising a first surface, a second surface and a side surface. The first surface has a plurality of first regions, a second region and a central line. The second region has a plurality of microstructures. The microstructures are outside the first regions thus the first regions are blank. The first regions and the second region are solid. The second surface is opposite the first surface. The side surface is disposed between the first surface and the second surface. The first regions are adjacent to the side surface and extend toward the central line, and the first regions are intervally spaced.

The present invention is further directed to a backlight module comprising: a plurality of point light sources and a light guide plate. The point light sources are used to provide a plurality of light beams. The light guide plate is the same as above-mentioned light guide plate, which is used to receive the light beams from the point light sources. Each of the point light sources corresponds to one of the first regions, and the light beams from the point light sources enter the light guide plate through the side surface.

In the present invention, the first regions and the designed microstructure distribution can reduce hot spots in front the point light sources efficiently. Additionally, since the first regions are solid, they are a part of the original light guide plate. That is, the first regions are not formed by cutting or injection molding. Therefore, the manufacture process of the light guide plate is simplified, and the manufacture cost of the light guide plate is lowered.

DETAILED DESCRIPTION OF THE INVENTION

Figure 1:
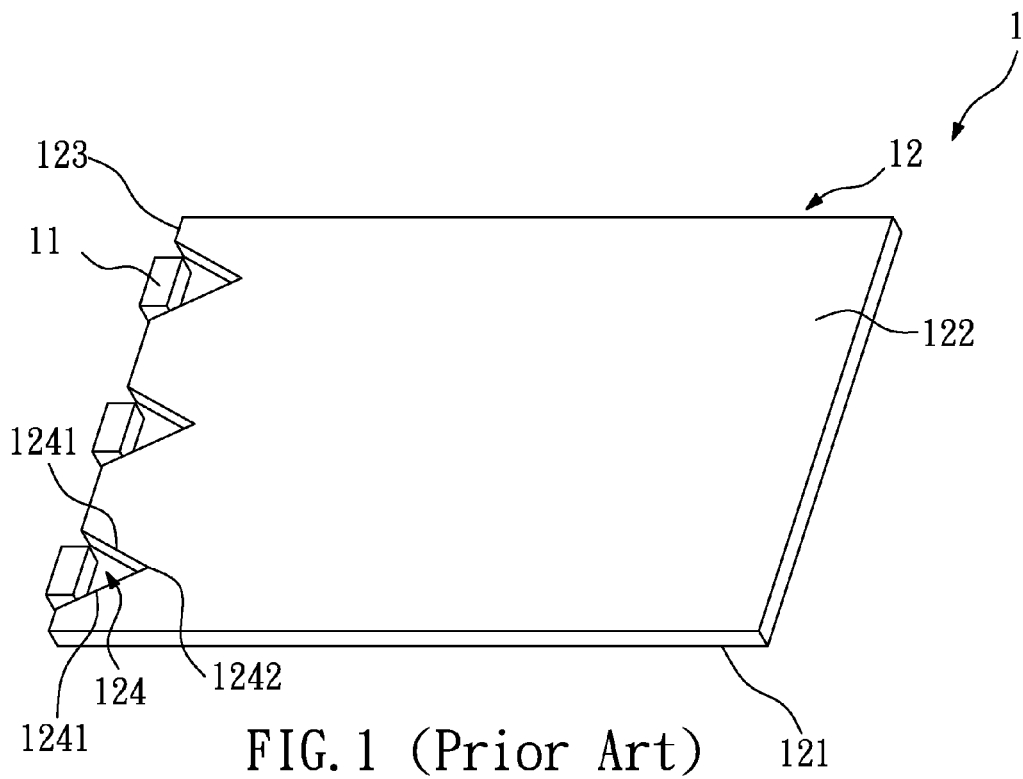
FIG. 1 is a schematic perspective view of a conventional backlight module disclosed in Taiwan (R.O.C.) patent publication no. 200504424.
Figure 2:
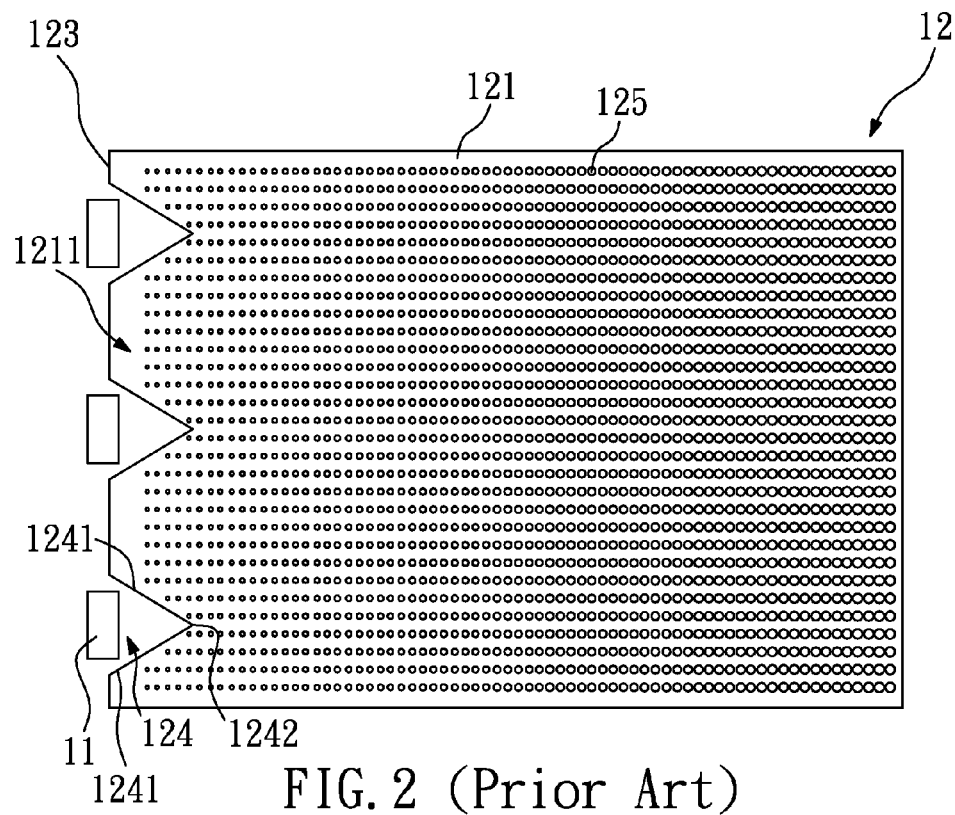
FIG. 2 is a bottom view of FIG. 1.
Figure 3:
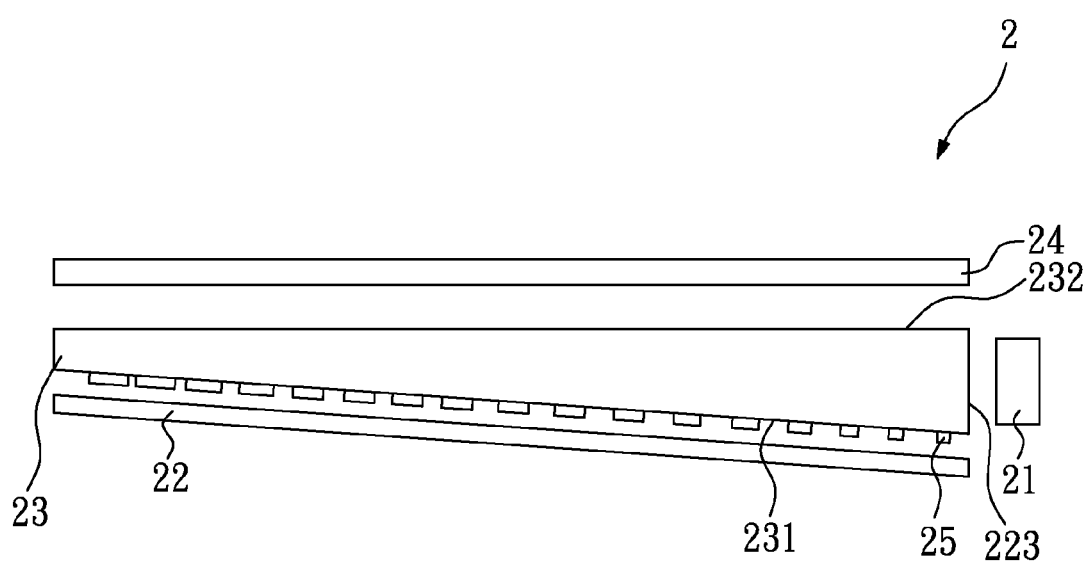
FIG. 3 is a schematic view of a backlight module according to an embodiment of the present invention.

FIG. 3 shows a schematic view of a backlight module according to an embodiment of the present invention. The backlight module 2 is an edge-lighting backlight module, which comprises a plurality of point light sources 21, a reflector 22, a light guide plate 23 and a diffusion film 24. The point light sources 21, for example, a plurality of LEDs, are used to provide a plurality of light beams. The reflector 22 is disposed below the light guide plate 23, and is used to reflect part of the light beams.

Figure 4:
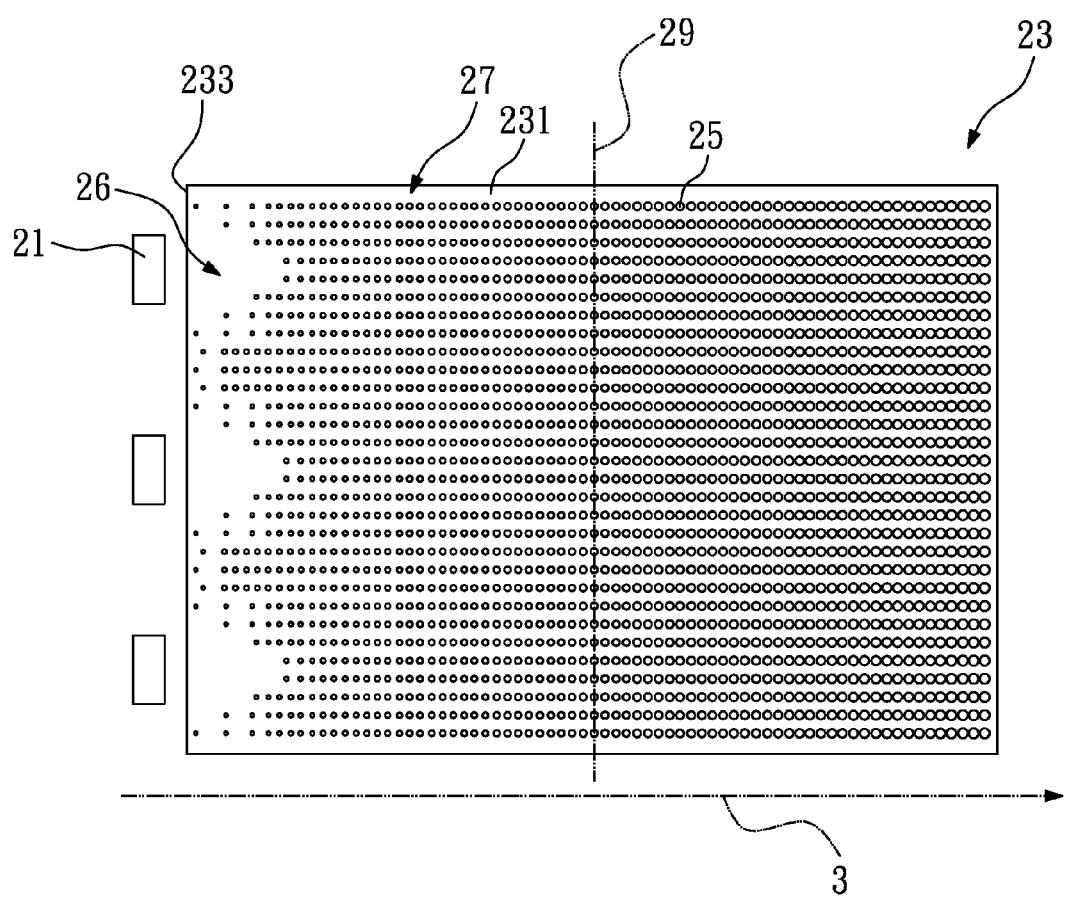
FIG. 4 is a bottom view of the light guide plate of FIG. 3.
Figure 5:
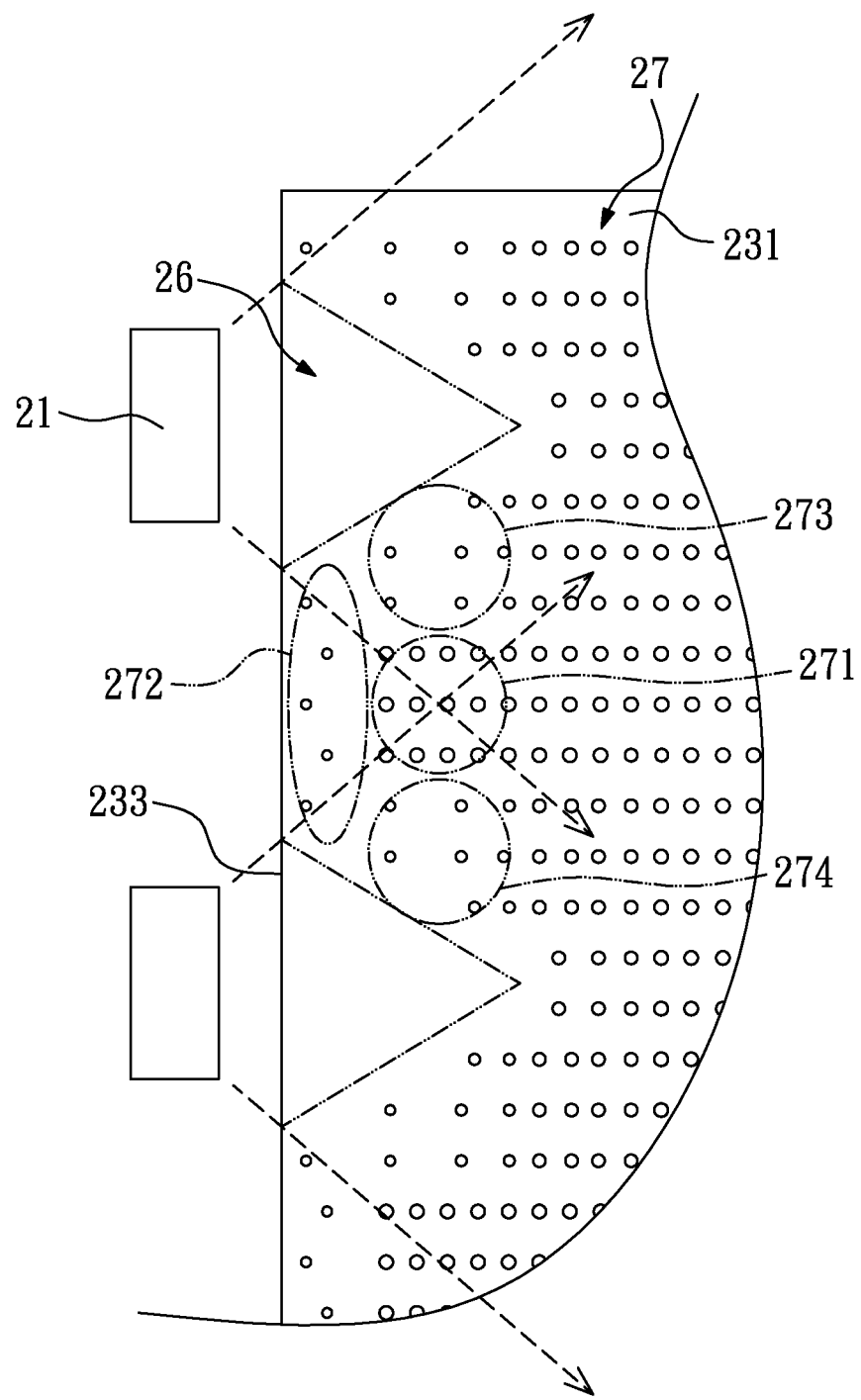
FIG. 5 is a partial enlarged view of FIG. 4.

The light guide plate 23 is used to receive the light beams from the point light sources 21. The light guide plate 23 may be a wedge type or plate type. The light guide plate 23 comprises a first surface 231, a second surface 232 and a side surface 233. The first surface 231 is opposite the second surface 232. The side surface 233 is disposed between the first surface 231 and the second surface 232. Preferably, the side surface 233 is a flat surface thereon, as shown in FIGS. 4 and 5. Alternatively, the side surface 233 may also have some microstructures (not shown) thereon.

The point light sources 21 face the side surface 233 so that the light beams from the point light sources 21 enter the light guide plate 23 through the side surface 233, and the light beams are then transmitted to the diffusion film 24 through the second surface 232. Preferably, the point light sources 21 contact the side surface 233.

FIGS. 4 and 5 show schematic bottom and partial enlarged views, respectively, of the light guide plate of FIG. 3. The first surface 231 has a plurality of first regions 26, a second region 27 and a central line 29. The first regions 26 and the second region 27 are solid, that is, the first regions 26 are not empty. Preferably, each of the point light sources 21 corresponds to one of the first regions 26. However, in another embodiment, some of the point light sources 21 correspond to some of the first regions 26, but other point light sources 21 do not correspond to the first regions 26. The second region 27 has a plurality of microstructures 25 thereon. The microstructures 25 are outside the first regions 26. That is, the microstructures 25 are disposed in the second region 27, and the first regions 26 are blank regions that have no printing an ink on the first surface 231, or protrusions or grooves that are formed by injection molding. The central line 29 is substantially parallel to the side surface 233.

The first regions 26 are adjacent to the side surface 233 and extend toward the central line 29, and the first regions 26 are intervally spaced. Further, the first regions 26 may extend from an edge of the side surface 233 or may be spaced apart from the edge. The width of each of the first regions 26 reduces gradually alongside a direction 3 from the side surface 233 toward the central line 29. Preferably, the configuration of each of the first regions 26 is semi-circular or triangular, with the minimal width part towards the central line 29.

As shown in FIGS. 4 and 5, the distribution of the microstructures 25 disposed near the central line 29 are denser than that of the microstructures 25 disposed near the side surface 233. The sizes of the microstructures 25 disposed near the central line 29 are larger than that of the microstructures 25 disposed near the side surface 233. The sizes of the microstructures 25 disposed around the first regions 26 are the smallest.

The second region 27 has a plurality of first sub-regions 271, a plurality of second sub-regions 272, a plurality of third sub-regions 273 and a plurality of fourth sub-regions 274. The first sub-region 271 and the second sub-region 272 are disposed in a central portion between two adjacent first regions 26. The light beams from two adjacent point light sources 21 intersect at the first sub-region 271. The second sub-region 272 is disposed between the first sub-region 271 and the side surface 233. The third sub-region 273 and the fourth sub-region 274 are disposed between the first sub-region 271 and the two adjacent first regions 26, respectively. The sizes of the microstructures 25 disposed in the first sub-regions 271 are larger than those of the microstructures 25 disposed in the second sub-regions 272, the third sub-regions 273 and the fourth sub-regions 274. The distribution of the microstructures 25 disposed in the first sub-regions 271 is denser than that of the microstructures 25 disposed in the second sub-regions 272, the third sub-regions 273 and the fourth sub-regions 274.

In the present invention, the distribution of the microstructures 25 can reduce hot spots in front the point light sources 21 efficiently. Additionally, since the first regions 26 are solid, they are a part of the original light guide plate 23. That is, the first regions 26 are not formed by cutting or injection molding. Therefore, the manufacture process of the light guide plate 23 is simplified, and the manufacture cost of the light guide plate 23 is lowered.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A light guide plate comprising:
a first surface, having a plurality of first regions, a second region and a central line, the second region having a plurality of microstructures, the microstructures being outside the first regions, and the first regions and the second region being solid;
a second surface, opposite the first surface; and
a side surface, disposed between the first surface and the second surface;
wherein the first regions are adjacent to the side surface and extend toward the central line, and the first regions are intervally spaced; the sizes of the microstructures disposed near the central line are larger than those of the microstructures disposed near the side surface, and the distribution of the microstructures disposed near the central line is denser than that of the microstructures disposed near the side surface.

2. The light guide plate as claimed in claim 1, wherein the width of each of the first regions reduces gradually alongside a direction from the side surface toward the central line.

3. The light guide plate as claimed in claim 2, wherein the configuration of each of the first regions is semi-circular or triangular.

4. The light guide plate as claimed in claim 1, wherein the microstructures are dots.

5. The light guide plate as claimed in claim 1, wherein the microstructures are protrusions or grooves.

6. The light guide plate as claimed in claim 1, wherein the central line is substantially parallel to the side surface.

7. The light guide plate as claimed in claim 1, wherein the sizes of the microstructures disposed around the first regions are the smallest.

8. The light guide plate as claimed in claim 1, wherein the second region has a plurality of first sub-regions, a plurality of second sub-regions, a plurality of third sub-regions and a plurality of fourth sub-regions, the first sub-region and the second sub-region are disposed in a central portion between two adjacent first regions, the second sub-region is disposed between the first sub-region and the side surface, the third sub-region and the fourth sub-region are disposed between the first sub-region and the two adjacent first regions, respectively, and the sizes of the microstructures disposed in the first sub-regions are larger than those of the microstructures disposed in the second sub-regions, the third sub-regions and the fourth sub-regions.

9. A backlight module comprising:
a plurality of point light sources for providing a plurality of light beams; and
a light guide plate for receiving the light beams from the point light sources, the light guide plate comprising:
a first surface, having a plurality of first regions, a second region and a central line, the second region having a plurality of microstructures, the microstructures being outside the first regions, the first regions and the second region being solid, and each of the point light sources corresponding to one of the first regions;
a second surface, opposite the first surface; and
a side surface, disposed between the first surface and the second surface, and the light beams from the point light sources enter the light guide plate through the side surface;
wherein the first regions are adjacent to the side surface and extend toward the central line, and the first regions are intervally spaced; the sizes of the microstructures disposed near the central line are larger than those of the microstructures disposed near the side surface, and the distribution of the microstructures disposed near the central line is denser than that of the microstructures disposed near the side surface.

10. The backlight module as claimed in claim 9, wherein the point light sources are LEDs.

11. The backlight module as claimed in claim 9, wherein the point light sources contact the side surface.

12. The backlight module as claimed in claim 9, wherein the width of each of the first regions reduces gradually from the side surface toward the central line.

13. The backlight module as claimed in claim 12, wherein the configuration of each of the first regions is semi-circular or triangular.

14. The backlight module as claimed in claim 9, wherein the microstructures are dots.

15. The backlight module as claimed in claim 9, wherein the microstructures are protrusions or grooves.

16. The backlight module as claimed in claim 9, wherein the central line is substantially parallel to the side surface.

17. The backlight module as claimed in claim 9, wherein the sizes of the microstructures disposed around the first regions are the smallest.

18. The backlight module as claimed in claim 9, wherein the second region has a plurality of first sub-regions, a plurality of second sub-regions, a plurality of third sub-regions and a plurality of fourth sub-regions, the first sub-region and the second sub-region are disposed in a central portion between two adjacent first regions, the light beams from two adjacent point light sources intersect at the first sub-region, the second sub-region is disposed between the first sub-region and the side surface, the third sub-region and the fourth sub-region are disposed between the first sub-region and the two adjacent first regions, respectively, and the sizes of the microstructures disposed in the first sub-regions are larger than those of the microstructures disposed in the second sub-regions, the third sub-regions and the fourth sub-regions.

* * * * *